United States Patent
Lee et al.

(10) Patent No.: US 9,170,605 B2
(45) Date of Patent: Oct. 27, 2015

(54) DISPLAY DEVICE OF ELECTRONIC APPLIANCE

(75) Inventors: Seung-Hyun Lee, Gyeonggi-do (KR); Hae-Sung Park, Gyeongsangnam-do (KR); Seung-Hyub Baek, Gyeonggi-do (KR); Hyun-Do Song, Gyeonggi-do (KR); Sang-Hyuck Jung, Gyeonggi-do (KR); Seung-Whee Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 78 days.

(21) Appl. No.: 13/558,668

(22) Filed: Jul. 26, 2012

(65) Prior Publication Data

US 2013/0120674 A1 May 16, 2013

(30) Foreign Application Priority Data

Nov. 15, 2011 (KR) ........................ 10-2011-0119204

(51) Int. Cl.
*G02F 1/1335* (2006.01)
*G06F 1/16* (2006.01)
*G02F 1/1333* (2006.01)

(52) U.S. Cl.
CPC .......... *G06F 1/1601* (2013.01); *G02F 1/13338* (2013.01); *G02F 1/133308* (2013.01); *G02F 2001/13332* (2013.01)

(58) Field of Classification Search
CPC ............ G06F 1/1601; G02F 1/133308; G02F 1/13338; G02F 2001/13332
USPC .......................................................... 349/12
See application file for complete search history.

(56) References Cited

U.S. PATENT DOCUMENTS

| | | | |
|---|---|---|---|
| 7,768,591 B2 * | 8/2010 | Chang et al. ..................... | 349/58 |
| 8,184,228 B2 * | 5/2012 | Han et al. ......................... | 349/58 |
| 2008/0068342 A1 * | 3/2008 | Chang et al. .................. | 345/173 |
| 2009/0160813 A1 * | 6/2009 | Takashima et al. ........... | 345/173 |
| 2010/0164885 A1 * | 7/2010 | Hosorogi ....................... | 345/173 |
| 2010/0175559 A1 | 7/2010 | Sepke | |
| 2011/0051063 A1 * | 3/2011 | Mori ............................. | 349/122 |
| 2011/0193789 A1 * | 8/2011 | Lin ................................ | 345/173 |

FOREIGN PATENT DOCUMENTS

KR 10-2011-0047531 A 5/2011

* cited by examiner

*Primary Examiner* — Bumsuk Won
*Assistant Examiner* — Charles Chang
(74) *Attorney, Agent, or Firm* — Cha & Reiter, LLC.

(57) ABSTRACT

A display device for an electronic appliance includes: a touch screen panel; an LCD panel; and an intermediate member provided between the touch screen panel and the LCD panel. The intermediate member has an air passage for allowing air to flow into and out of an interior space defined by the intermediate member between the touch screen panel and the LCD panel. The air passage has a plurality of paths oriented in different directions.

14 Claims, 7 Drawing Sheets

DISPLAY DEVICE OF ELECTRONIC APPLIANCE

CLAIM OF PRIORITY

This application claims the priority under 35 U.S.C. §119(a) of an application entitled "Display Device Of Electronic Appliance" filed in the Korean Intellectual Property Office on Nov. 15, 2011 and assigned Serial No. 10-2011-0119204, the contents of which are hereby incorporated by reference.

BACKGROUND

1. Technical Field

The present invention relates to an electronic appliance, and more particularly to a display device for displaying images in an electronic appliance.

2. Description of the Related Art

In general, a portable appliance is a category of an electronic appliance and refers to an appliance that can be carried by a user during its operation of receiving and displaying/reproducing various contents. Examples include portable terminals, MP3 players, PMPs (Portable Multimedia Players), electronic books, etc.

Due to the easy portability of portable electronic appliances and various functions installed therein, portable terminals are frequently used while the users thereof are in motion. The physical styles (form factors) of portable electronic appliances have evolved in accordance with the applications, periodic trend changes and consumer demand. Rectangular shaped (bar-type) portable terminals having expanded functionality, such as smart phones and tablet PCs, have become increasingly popular.

In particular, as electronic scheduler and multimedia functions are incorporated in the bar type portable terminals, it becomes possible to display various contents and perform widespread functions, from voice calling to banking transactions, game/multimedia service and wireless Internet service, etc. with a single portable terminal. In such a bar-type portable terminal, data input devices for inputting data, selecting icons, etc. and data output devices for outputting images and data are implemented through one large display device on the front side thereof.

A display device for today's electronic appliances includes a touch screen panel and an LCD (Liquid Crystal Display) panel provided on the rear side of the touch screen panel. Recently, the sizes of bar-type electronic appliances have progressively increased to realize the largest screen possible as long as they are portable.

A conventional display device for an electronic appliance is disclosed in Korean patent publication No. 10-2011-0047531 published on Aug. 9, 2011 and entitled "Touch Screen Panel."

Figure 1:
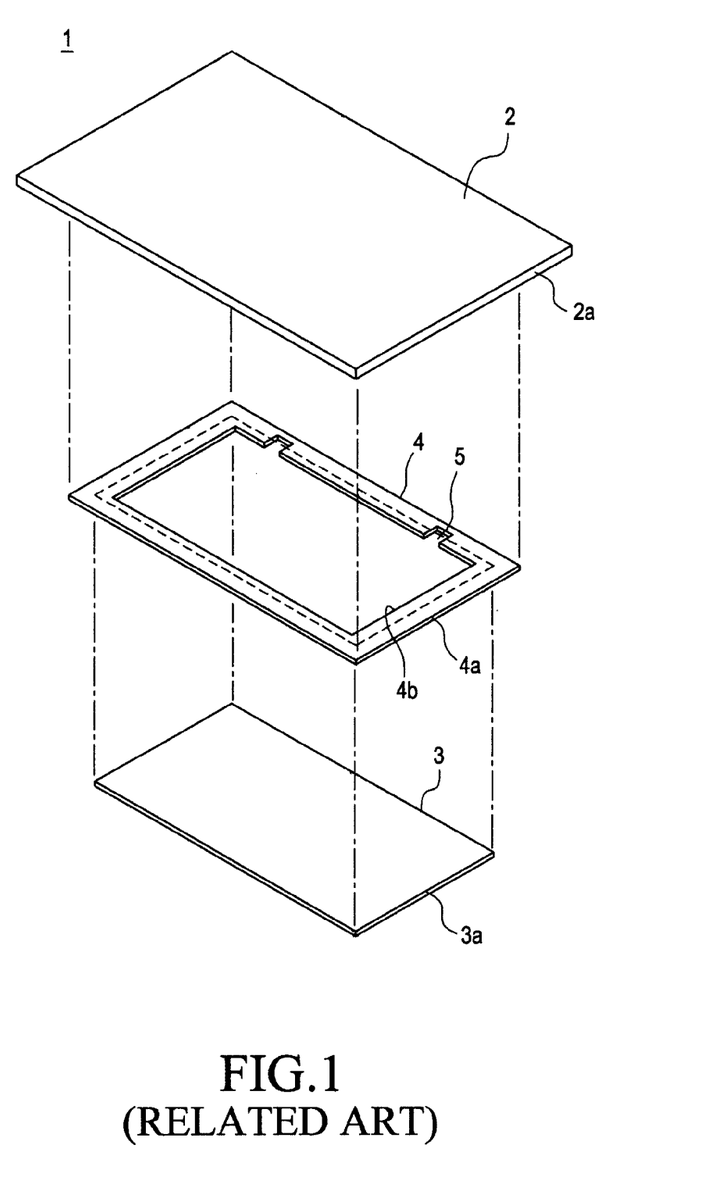
FIG. 1 is an exploded perspective view briefly showing a related art display device for an electronic appliance.
Figure 2:
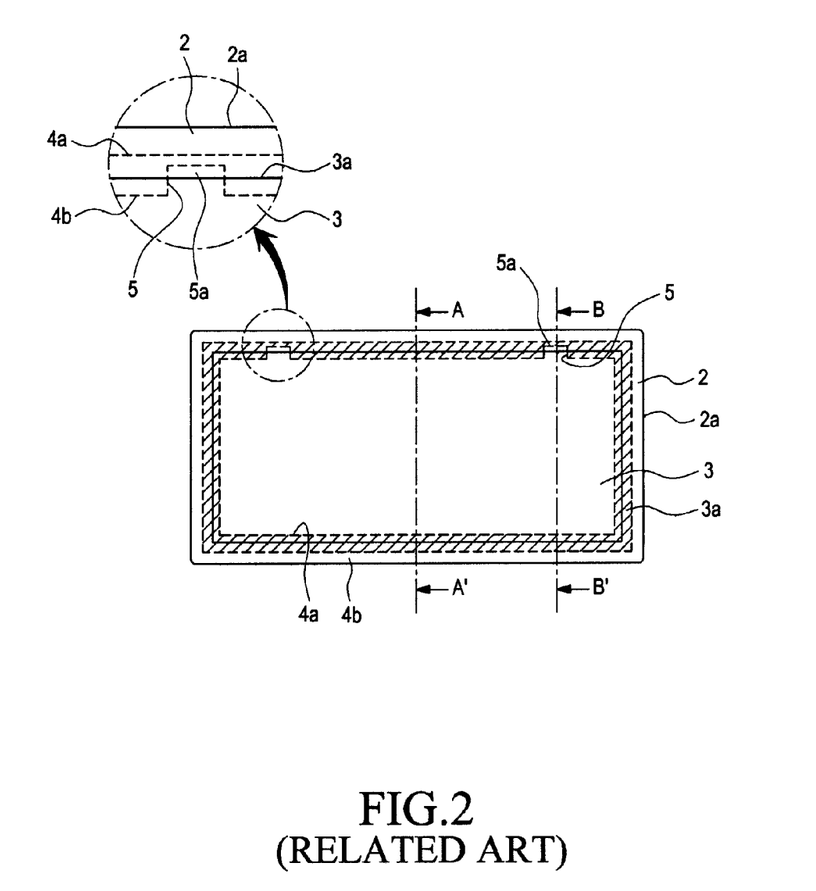
FIG. 2 is a top plan view of the conventional display device.
Figure 3:
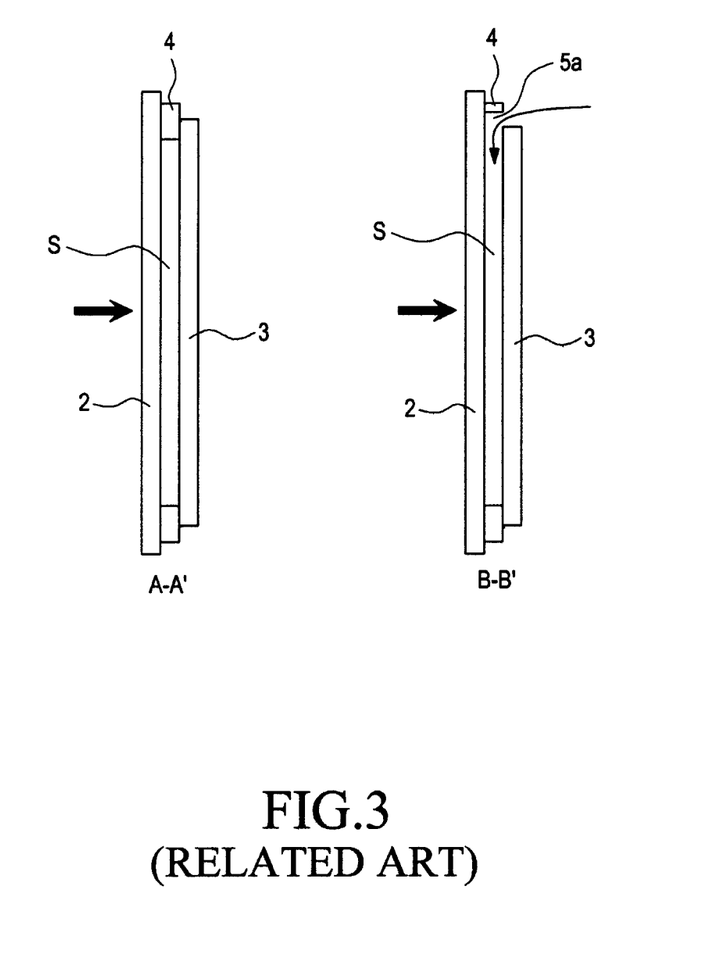
FIG. 3 shows cross-sectional views taken along lines A-A' and B-B'.

FIGS. 1, 2 and 3 show an exploded perspective view broadly illustrating a conventional display device for an electronic appliance, a top plan view of the display device in the assembled state, and cross-sectional views taken along lines A-A' and B-B' of FIG. 2, respectively.

Referring to FIGS. 1 to 3, a display device 1 for an electronic appliance includes a touch screen panel 2, an LCD panel 3 provided behind the touch screen panel 2, and a "sponge" 4 provided between the touch screen panel 2 and the LCD panel 3. Sponge 4 has the shape of a rectangular frame. The touch screen panel 2 has a larger area than the LCD panel 3, and the sponge 4 is sized and positioned such that the outer periphery of the LCD panel 3 overlays a central region of the sponge's frame (as indicated by the dotted lines in FIG. 1).

The sponge 4 interposed between the touch screen panel 2 and the LCD panel 3 is provide to form a space S between the touch screen panel 2 and the LCD panel 3. In addition, the sponge 4 maintains the space S between the touch screen panel 2 and the LCD panel 3 in a sealed state.

An inner periphery 4b of the sponge 4 is smaller than the outer periphery 3a of the LCD panel. Therefore, the outer periphery 4a of the sponge 4 is laid between the outer periphery 3a of the LCD panel 3 and the outer periphery 2a of the touch screen panel 2, and the inner periphery 4b of the sponge 4 is laid inside of the outer periphery 3a of the LCD panel 3.

The sponge 4 prevents foreign matter, such as dust, from being introduced into the space S between the LCD panel 3 and the touch screen panel 2, and dampens impact applied to the LCD panel 3 by the touch screen panel 2 as the touch screen panel 2 is pushed. In addition, when the touch screen panel 2 is pushed via touch contact, the air confined by the sponge 4, the touch screen panel 2 and the LCD panel 3 applies a force to the touch screen panel 2 to return the touch screen panel 2 to its original position.

One or more grooves 5 are formed on one side of the inner periphery 4b of the sponge 4 and extend outwardly from the inner periphery 4b of the sponge 4. In a state in which the touch screen panel 2, the sponge 4 and the LCD panel 3 are assembled in this order, the grooves 5a extend outwardly beyond the outer periphery of the LCD panel 3. Thus the space S between the touch screen panel 2 and the LCD panel 3 is "connected" to the exterior through gaps formed at the end parts of the grooves 5 (hereinafter, the gaps will be referred to as an "air communication holes 5a") (see, the cross-sectional view taken along line B-B' in FIG. 3).

Therefore, the air confined in the space S between the touch screen panel 2 and the LCD panel 2 is caused to flow out to the outside through the air communication holes 5a via the pressure applied in touching the touch screen panel 2. The air is caused to flow into the space S through the air communication holes 5a when the touch pressure is removed.

With each of the air communication holes 5a formed by a portion of a groove 5 that is not covered by the LCD cover 3, the air communication holes 5a are very narrow. Therefore, after flowing out to the outside through the air communication holes 5a and through the junction surfaces of the sponge 4 (between the touch screen panel 2 and the sponge 4 or between the LCD panel 3 and the sponge 4) from the space S, air flow back into the space through the air communication holes 5a is restricted and is slow to return. Such restriction is due to a pressure differential between the inside and outside air occurring as a consequence of the touch pressure. As a result, there is a problem in that the touch screen panel 2 and the LCD panel 3 become more closely spaced with one another.

As the touch screen panel 2 and the LCD panel 3 become more closely spaced with each other, an oil film phenomenon occurs, by which rainbow colors appear through the touch screen panel 2.

If the air can be reintroduced between the touch screen panel 2 and the LCD panel 3, the pushed touch screen panel can be rapidly returned to its original position due to the increase of the spatial volume due to the introduction of the air. As a result, even if the oil film phenomenon occurs, the oil film can be rapidly removed. However, since the reintroduction of air through the air communication holes 5a is restricted, the removal of oil film phenomenon may be very slow or may not be executed.

In particular, if the sponge 4 is not arranged at its correct position between the touch screen panel 2 and the LCD panel 3, the grooves 5 may be entirely covered by the LCD panel 3 to such an extent that the air communication holes 5a are not formed. In this condition, the space S between the touch screen panel 2 and the LCD panel 2 is not connected to the outside. If, however, the air between the touch screen panel 2 and the LCD panel 3 escapes to the outside through the sponge 4 as the touch screen panel 2 is pushed, a problem arises in that air may be unable to flow back into the space S.

SUMMARY

Accordingly, an aspect of the present disclosure is to solve the above-described problems, and to provide a display device which allows air to be easily introduced and discharged between a touch screen panel and an LCD panel in an electronic appliance.

Another aspect is to provide a display device, in which the touch screen panel of the display device can be rapidly returned to its original position when it is pushed via touch screen contact, whereby an occurrence of any oil film phenomenon can be rapidly removed.

In an embodiment, a display device for an electronic appliance includes a touch screen panel; an LCD panel; and an intermediate member provided between the touch screen panel and the LCD panel. The intermediate member has an air passage with a plurality of paths oriented in different directions, for allowing air to flow into and out of an interior space defined by the intermediate member between the touch screen panel and the LCD panel.

The plurality of paths of the air passage may include an outer path leading to an outer periphery of the intermediate member and to air external of the display device; an inner path spaced apart from the outer path and leading to the interior space; and a central path interconnecting the inner and outer paths. The central path may run in a direction parallel to a side of the intermediate member within which the central path is formed. Each of the inner and outer paths can be oriented at a slanted angle with respect to the orientation of the central path.

The central path can be longer than each of the inner and outer paths, and the inner and outer paths can be oriented parallel to one another.

The display device can further include at least one foreign matter accumulation part for filtering foreign matter contained in the air.

The at least one foreign matter accumulation part can comprise a first foreign matter accumulation part provided in proximity to the outer path; and a second foreign matter accumulation part provided in proximity to the inner path.

In another embodiment, an electronic appliance includes a display device and an air passage provided in the display device to allow air to be introduced into the inside of the display device, the air passage having a plurality of paths oriented in different directions.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS

Hereinafter, embodiments of the present invention will be described with reference to the accompanying drawings. In the following description, the same elements will be designated by the same reference numerals although they are shown in different drawings. In the drawings, the thickness of lines and sizes of components may be exaggeratedly expressed for the clarity and convenience of description. The terminologies used hereinbelow are those defined in consideration of functions in the present invention, and different terminologies may be used in accordance with an intention of a user or an operator or a practice.

Although ordinal numbers, such as first, second or the like, are used in the embodiments of the present invention, they are merely used so as to distinguish elements with the same name. However, the order of such elements may be optionally determined, and a description firstly made for one of such elements may be applied to the other element(s).

A construction of several embodiments of the inventive display device will be described with reference to FIGS. 4 to 9.

Figure 4:
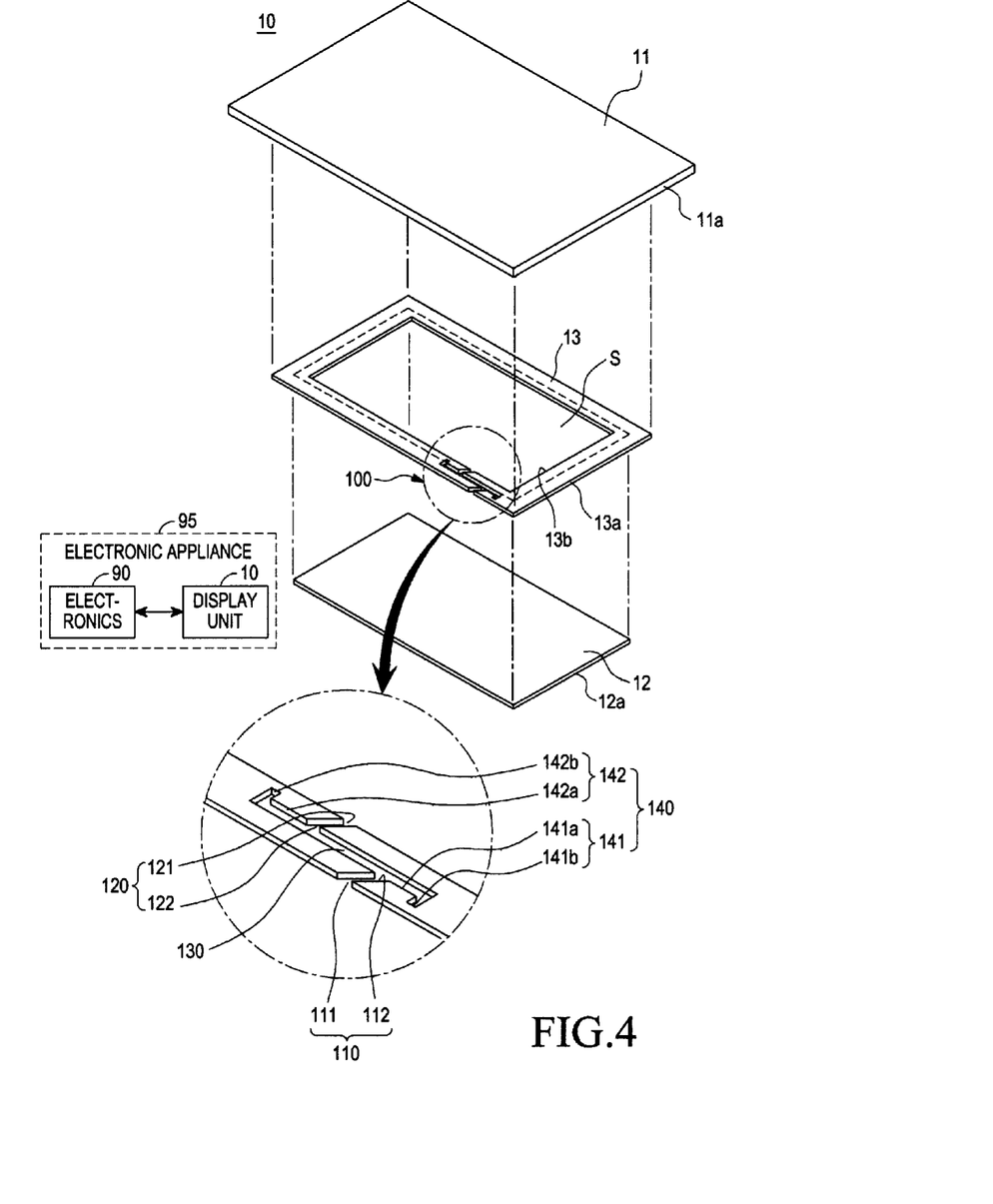
FIG. 4 is an exploded perspective view briefly showing a display device for an electronic appliance in accordance with an embodiment of the present invention.

FIG. 4 illustrates an exploded perspective view broadly showing a display device, 10, for use in an electronic appliance in accordance with an embodiment. FIG. 4 also schematically illustrates an electronic appliance 95 including display device 10 coupled to appliance electronics 90.

As shown, display device 10 includes a touch screen panel 11, an LCD panel 12 and an intermediate member 13. Touch screen panel 11 is exposed to the outside, and is operated when a user touches or comes into contact with a surface thereof. Touch screen panel 11 is positioned above the top surface of the LCD panel 12 with a space S formed between the touch panel 11 and the LCD panel 12 due to the separation via member 13. The touch screen panel 11 may be an electrostatic capacitive type or a resistive type.

The LCD panel 12 is installed between a display part bracket (not shown) of electronic appliance 95 and the touch screen panel 11. The rear side of the LCD panel 12 is seated on the display bracket, and the top side of the LCD panel 12 is disposed opposite the rear side of the touch screen panel 11. As the display device 10 is seated on the top of the display bracket and then the display bracket is integrally engaged with a front case of electronic appliance 95, the display bracket closes the interior of the front case of the electronic appliance in a state in which the display device 10 is exposed from the front case. The physical engagement between a display device and other components of an electronic appliance is well known and not critical to the present invention; a detailed description thereof is therefore omitted from this disclosure.

Figure 5:
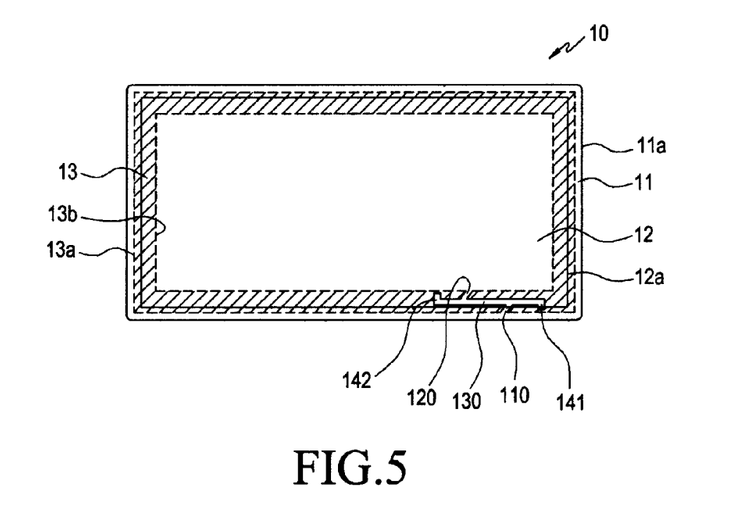
FIG. 5 is a top plan view of the display device in which the touch screen panel, the intermediate member and the LCD panel shown in FIG. 4 are stacked one on another.
Figure 6:
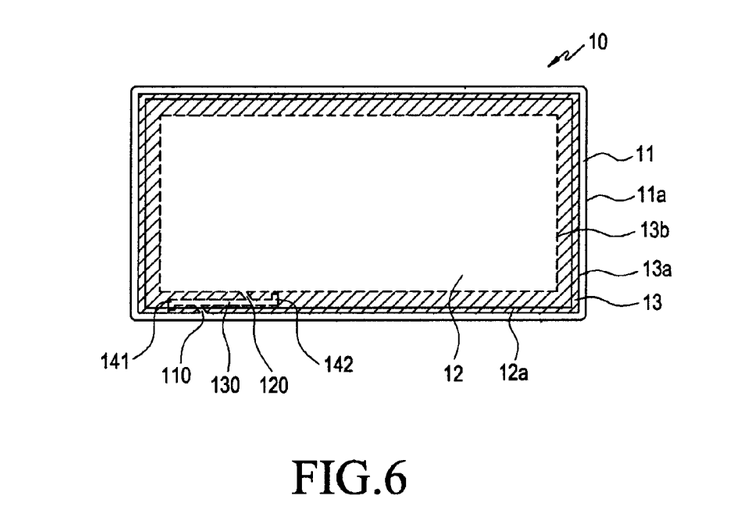
FIG. 6 is a bottom plan view of the display device of FIG. 5.

FIG. 5 is a top plan view of the display device 10 in which the touch screen panel 11, the intermediate member 13 and the LCD panel 12 shown in FIG. 4 are stacked one on another. FIG. 6 is a bottom plan view of the display device of FIG. 5.

As illustrated in FIGS. 5 and 6, the intermediate member 13 is provided between the touch screen panel 11 and the LCD panel 12. The intermediate member 13 has a picture frame shape (i.e., outer periphery shaped as a rectangle with central rectangular region cut out). Thus a space S (hereinafter, to be referred to as an "inner space" or "interior space") is formed between the touch screen panel 11 and the LCD panel 12 as in the related art devices described earlier with reference to FIGS. 1-3. Intermediate member 13 of the present embodiment is configured to interconnect the touch screen panel 11 and the LCD panel 12, to form and seal the inner space S, and to allow air to flow between the inner space S and the outside through an air passage 100. Upon comparing the LCD panel 12, the intermediate member 13 and the LCD panel 12 in terms of size when assembling them, the LCD panel 10 has a size smaller than that of the touch screen panel 11, and the inner opening of the intermediate member 13 has a size smaller than the LCD panel 12. More specifically, the outer periphery 13a of the intermediate member 13 is larger than the outer periphery 12a of the LCD panel 12, but smaller than the outer periphery 11a of the touch screen panel 11, and the inner periphery 13b of the intermediate member 13 is smaller than the outer periphery 12a of the LCD panel 12. Accordingly, the outer periphery 13a of the intermediate member 13 is laid between the outer periphery 12a of the LCD panel 12 and the outer periphery 11a of the touch screen panel 11, and the inner periphery 13b of the intermediate member 13 is laid inside of the outer periphery 12a of the LCD panel 12. In other implementations, the LCD panel 12 can be the same size as the touch screen panel 11.

Figure 7:
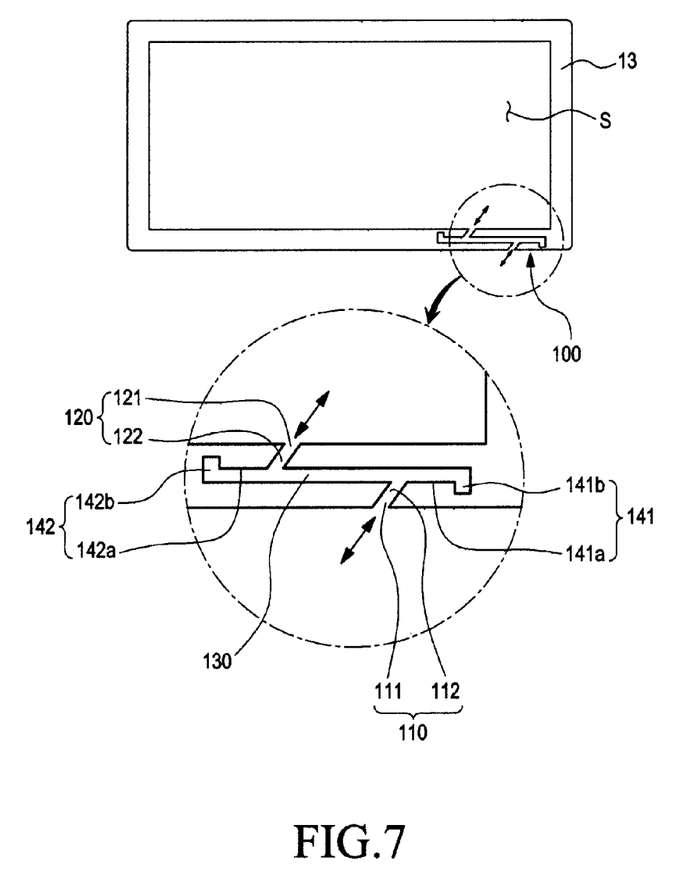
FIG. 7 shows the intermediate member shown in FIG. 4 and the air passage provided in the intermediate member.

FIG. 7 shows an embodiment of intermediate member 13 and the air passage 100 provided therein. Air passage 100 is designed to allow air to freely flow in and out from the interior space S and the exterior of the electronic appliance 95. The air passage 100 is formed to be slanted or curved two or more times at the side portion of the intermediate member 13, so that air can flow into or flow out from the space S through the air passage 100. That is, in a state in which the intermediate member 13 is arranged between the touch screen panel 11 and the LCD panel 12, the air passage 100 interconnects the inner space S and the outside. A first inlet/outlet port 111 to be described later is exposed to the outside of the outer periphery 12a of the LCD panel 12, and a second inlet/outlet port 121 is exposed to the inner space S. Consequently, the air confined within the inner space S can be discharged from the inner space S through the air passage 100, and the air of the outside can be introduced into the inner side S through the air passage 100.

The air passage 100 includes first passage (interchangeably, "outer path") 110 which leads to the exterior air around display unit 10, second passage (interchangeably, "inner path") 120 which leads to the interior space S, and third passage (interchangeably, "central path") 130 which interconnects outer path 110 to inner path 120. First passage 110 is comprised of inlet/outlet port 111 which is the opening of the passage 110 interfacing with the exterior air around display unit 10, and passage part 112 which defines the path of the entire length of the passage. Likewise, second passage 120 is comprised of inlet/outlet port 121 interfacing with the interior space S and passage part 122.

Paths 110, 120 and 130 can be defined by slots in intermediate member 13 that run completely through intermediate member 13, as illustrated. In this implementation, intermediate member 13 is separated at the air passage 100. In alternative implementations, channels that do not run completely through member 13 can be employed. Another alternative is to form tunnels or holes instead of the slots.

Considering the air passage 100 in accordance with its function, the passage parts 111, 122 and 130 are spaced apart from the outside or inside of the intermediate member 13, and the spaced ends thereof are interconnected with each other to allow air to flow through the passage parts, in which the inlet/outlet parts 111 and 121 allows air to be introduced into or discharged from the passage parts 112, 122 and 130 at the inner and outer peripheries 13b and 13a of the intermediate member 13. The passage parts 112, 122 and 130 may be referred to as a first connection passage 112, a second connection passage 122 and a third passage 130 interconnecting the first and second connection passages 112 and 122 in accordance with the formed positions thereof in the intermediate member 13. Briefly discussing this construction, the first connection passage 112 is positioned at the right portion of the air passage 100, and the second connection passage 122 is positioned at the left portion of the air passage 100. The third passage 130 interconnects the adjacent ends of the first connection passage 112 and the second connection passage 122, in which the third passage 130 is preferably formed to extend in the longitudinal direction of the corresponding side of the intermediate member 13. The inlet/outlet ports 111 and 121 are formed at the corresponding positions on the inner and outer peripheries 13a and 13b of the intermediate member 13 to be spaced apart from each other, so that air flowing through the passage parts 112, 122 and 130 can flow out to the outside or flow into the inner space S. The inlet/outlet ports 111 and 121 include a first inlet/outlet port 111 and a second inlet/outlet port 121. Briefly discussing this construction, the first inlet/outlet port 111 is provided at a position on the outer periphery 13a of the intermediate member in order to allow air to flow into or to flow out from the first connection passage 112, and the second inlet/outlet port 121 is provided at a position on the inner periphery 13b of the intermediate member 13 in order to allow air to flow into or to flow out from the second connection passage 122.

Upon dividing the air passage 100 in terms of construction, the air passage 100 includes a first passage 110, a second passage 120 and a third passage 130. Each of the first, second and third passages 110, 120 and 130 is formed linearly in this exemplary embodiment.

The first passage 110 is positioned at an outer part of the air passage 100. The air of the outside is introduced into the air passage 110 through the first passage, and the air of the inner space S is discharged to the outside through the first passage via the second and third passages 120 and 130. The first passage 110 includes the first inlet/outlet port 111 and the first connection passage 112. The first inlet/outlet port 111 is formed at a position on the outer periphery 13a of the intermediate member 13 so as to allow the introduction or discharge of air. That is, the air from the outside can be introduced into the first connection passage 112 through the first inlet/outlet port 111, or the air introduced into the inner space S through the second inlet/outlet 121 can be discharged through the first air inlet/outlet port 111.

The first connection passage 112 interconnects the first inlet/outlet port 111 and one end of the third passage 130 (referring to FIG. 5, the first connection passage 12 is connected to the right end of the third passage 130). The first connection passage 112 allows the air entering the first inlet/outlet port 111 from the outside to be introduced into the third passage 130, or allows air introduced into the inner space S along the third passage to escape to the first inlet/outlet port 111. In the exemplary embodiment of FIGS. 4-7, the first connection passage 112 is oriented at a slanted angle (incline) with respect to the orientation of central path 130. However, the other orientations and shapes for first connection passage 112 are possible For example, as in other embodiments (see FIGS. 8 and 9), the first connection passage can be alternatively oriented perpendicular to the central path 130 (see connection passages 112a, 112b, discussed later).

The first connection passage 112 is disposed slanted (inclined) with respect to the third passage 130. Specifically, the first connection passage 112 is inclined to upwardly extend from the left to the right (with reference to FIG. 5). As the first connection passage 112 is inclinedly formed, the air introduced through the first inlet/outlet port 111 is introduced into a first foreign matter entrance part 141 extending to the right from the third passage 130 rather than being directly introduced into the third passage 130. As the air introduced from the outside is moved to the first foreign matter entrance part 141, foreign matter contained in the air can be filtered. In addition, the air filtered by the first foreign matter entrance part 141 is moved to the third passage 130 due to the difference in pressure between the inner space S and the outside. In addition, the first connection passage 112 and the second connection passage 122 can be formed parallel to each other, as in the illustrated embodiment.

The second passage 120 is positioned adjacent to the inner periphery of the intermediate member 13 away from the first passage 110. Through the second passage 120, air flows into or flows out from the inner space S. The air confined in the inner space S can be discharged through the second passage 120 as the touch screen panel 11 is pushed by a touch or the like, and the air introduced from the first passage 110 due to the difference in pressure between the inner space S and the outside is introduced into the inner space S through the second passage 120 via the third passage 130. The second passage 120 includes a second inlet/outlet port 121 and a second connection part 122. The second inlet/outlet port 121 is formed at a position on the inner periphery 13b of the intermediate member 13b to allow the air confined within the inner space S to be moved to the third passage 130, and to allow the air moved along the third passage 130 to be introduced into the inner space S.

The second connection passage 122 interconnects the second inlet/outlet port 121 and another end of the third passage 130 (referring to FIG. 5, the second connection part 122 extends to the left end of the third passage 130). The second connection passage 122 guides the air introduced into the inner space S through the second inlet/outlet port 121 to flow to the third passage 130, and guides the air moved along the third passage 130 from the outside to flow to the second inlet/outlet port 121. In the present embodiment, the second connection passage 122 may be inclinedly formed from the second inlet/outlet port 121 to the third passage 130. However, this is merely an example, and can be variously modified as in other embodiments (see FIGS. 8 and 9) for the second connection passage. For example, the second connection passage 122a or 122b may be formed to extend vertically from the second inlet/outlet port 121 to the third passage 130.

The second connection passage 122 is inclinedly formed from the second inlet/outlet port 121 to the third passage 130. Specifically, the second connection passage 122 is formed to be inclined downwardly from the left to the right (with reference to FIG. 5) parallel to the first connection passage 112. As the second connection passage 122 is inclinedly formed, the air moved through the third passage 130 from the outside is introduced into a second foreign matter entrance part 142 extending from the third passage 130 rather than being directly introduced into the second connection passage 122. Accordingly, foreign matter contained in the air introduced from the outside and firstly filtered by the first foreign matter entrance part 141 can be secondarily filtered in the second foreign matter entrance part 142. The slant angle of inner path 120 with respect to central path 110 may be the same as the slant angle of outer path 110, such that inner path 120 run in parallel directions.

The third passage 130 interconnects the first and second passages 110 and 120. The third passage 130 interconnects the adjacent ends of the first and second passages 110 and 120 to be communicated with each other. The third passage 130 guides the movement of air flowing into and out of the air passage 100 through the first inlet/outlet port 111 and the second inlet/outlet port 121. That is, the air introduced through the first passage 110 from the outside can be introduced into the second passage 120 and then into the inner space S through the third passage 130, and the air introduced into the second passage 120 from the inner space S can flow out to the first passage 110, and then to the outside through the third passage 130.

The opposite ends of the third passage 130 further include at least one foreign matter accumulation part 140 (see FIG. 4) which can be comprised of a pair of foreign matter accumulation parts 141, 142 at opposite ends of central path (third passage) 130. In the present embodiment, each of the foreign matter accumulation parts 141, 142 may extend left or right from one of the opposite ends of the third passage 130. However, the present invention is not limited to this. For example, the foreign matter accumulation parts 141, 142 may be formed at the opposite ends of the third passage 130 in a recessed manner at the ends of the first and second connection passages 112 and 122 opposite to the first and second inlet/outlet ports 111a and 121a, respectively (as shown, e.g., in FIG. 9). Alternatively, it is possible to provide one or more filter members, such as an air filter, in the air passage 100, so that foreign matter contained in air can be filtered. Other shapes or constructions may be alternatively employed for the foreign matter accumulation part(s).

The foreign matter accumulation part 140 in the illustrated embodiment include a first foreign matter entrance part 141 and a second foreign matter entrance part 142.

The first foreign matter entrance part 141 extends from one end of the third passage 130 to extend to the right from the right end of the third passage 130 (with reference to FIG. 7). The first foreign matter entrance part 141 firstly filters foreign matter contained in the air introduced through the first inlet/outlet port 111. The first foreign matter entrance part 141 includes a first extension passage 141a and a first accumulation opening 141b. The first extension passage 141a extends to the right from the one end of the third passage 130. The air guided to the inclined first connection passage 112 is introduced into the first extension passage 141a due to the its inclined moving direction. The first accumulation opening 141b is formed in a slot shape curved outward of the intermediate member from the first extension passage, so that the foreign matter contained in the air is accumulated in the first accumulation opening 141b. After the foreign matter contained in the air introduced from the outside is firstly accumulated in the first accumulation opening 141b, the air is then guided to the third passage 130 through the first extension passage 141a.

The second foreign matter entrance part 142 extends from the other end of the third passage 130 to extend to the left from the left end of the third passage 130 (with reference to FIG. 7), the left end of the third passage 130 being connected to the second connection passage 122.

The second foreign matter entrance part 142 secondarily filters foreign matter remaining in the firstly filtered air without being filtered by the first foreign matter entrance part 141. In addition, the air moved along the third passage 130 is firstly introduced into the second foreign matter entrance part 142 due to the moving direction of the air rather than being introduced into the second connection passage 122.

The second foreign matter entrance part 142 includes a second extension passage 142a and a second accumulation opening 142b. Since the foreign matter contained in the air from the outside was firstly filtered by the first foreign matter entrance part 141, foreign matter is scarcely contained in the air from the outside. However, the foreign matter unfiltered by the first foreign matter 141 is filtered once again through the second foreign matter entrance part 142.

The second extension passage 142a extends to the left from the one end of the third passage 130. Since the second extension passage 142a is connected and communicated with the third passage 130 in a straight line, most of the air moved along the third passage 130 from the outside is introduced into the second extension passage 142a. However, the air moved along the third passage 130 from the outside is partially introduced into the second inclined connection passage 122. Even if a part of the air is directly introduced into the inner space S through the second connection passage 122, foreign matter is scarcely contained in the air introduced into the inner space S from the outside, since the foreign matter contained in the air was already firstly filtered by the first foreign matter entrance part 141.

The second accumulation opening 142 is formed in a slot shape curved toward the inner periphery of the intermediate member 13 from the end of the second extension passage 142a, wherein foreign matter is accumulated within the second accumulation opening 142. The foreign matter contained in the air passing the second extension passage 142a is accumulated in the second accumulation opening 142b, thereby being filtered once again. The air secondarily filtered by the second foreign matter entrance part 142 is guided to the second connection passage 122, and introduced into the inner space S through the second inlet/outlet port 121.

Although it was described that the foreign matter accumulation parts 140 include the first and second extension passages 141a and 142a and the first and second accumulation openings 142 and 142b, respectively, the present invention is not limited to this. For example, one or more filter members may be provided along the air passage 100. Alternatively, the air passage 100 can be variously modified as in other embodiments as shown in FIGS. 8 and 9.

If the touch screen panel 11, the intermediate member 13 and the LCD panel 12 are stacked in this order, the first inlet/outlet port 111 of the air passage 100 is exposed to the outside, and the second inlet/outlet port 121 is exposed to the inner space S, thereby interconnecting the inner space S and the outside without being blocked by the LCD panel 12. If the touch screen panel 11 is pushed by a touch or the like, the air confined in the inner space S is introduced into the third passage 130 through the second passage 120, and then moved along the first passage 110, thereby escaping to the outside. If the pressure within the inner space S is reduced after the air escapes to the outside, air is introduced into the space S from the outside through the first passage 110. The air introduced from the outside through the first inlet/outlet port 111 is moved through the first connection passage 112 which extends from the inlet/outlet port 111 upwardly to the right to be inclined. Due to this arrangement of the first connection passage 112, the air passing the first connection passage 112 is moved to the right end of the third passage 130. Foreign matter contained in the air is accumulated in and filtered by the first accumulation opening 141b provided at the right end of the third passage 130, and then the air is moved along the third passage 130. The air moved along the third passage 130 is introduced into the extension passage 142a provided in the moving direction, and the foreign matter remaining in the air without being filtered by the first accumulation opening 141b is accumulated in the second accumulation opening 142b. The air filtered by the first foreign matter entrance part 141 and the second foreign matter entrance part 142 is moved to the second connection passage 122, and then introduced into the inner space S through the second inlet/outlet port 121. As a result, the pushed touch screen panel 11 can be returned to its original position, and the oil film phenomenon can be instantly removed if it occurs when the touch screen panel 11 is touched and pushed.

Figure 8:
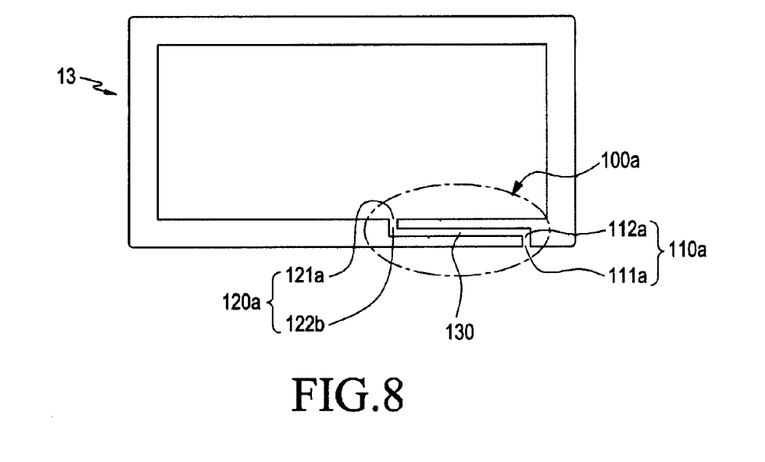
FIG. 8 shows another embodiment for the air passage in the intermediate member shown in FIG. 7.
Figure 9:
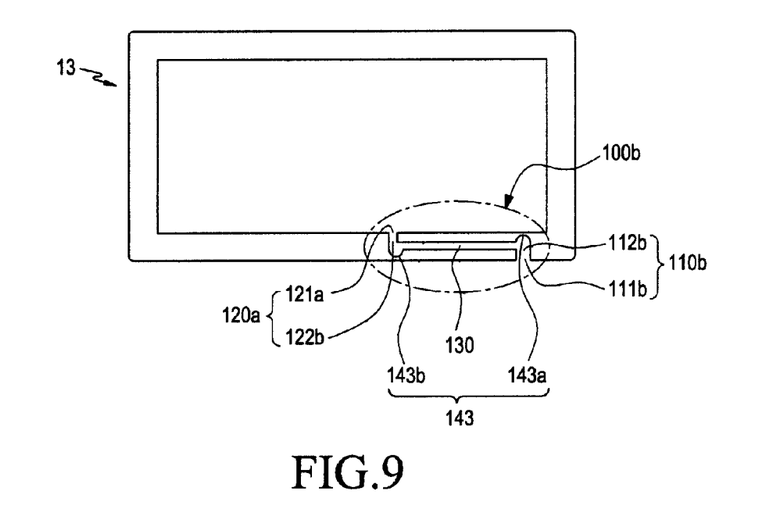
FIG. 9 shows still another embodiment for the air passage in the intermediate member shown in FIG. 7.

FIG. 8 shows another embodiment, 100a, for the air passage in the intermediate member shown in FIG. 7. As shown in FIG. 8, the air passage 100a differs from the air passage 100 and the first and second connection passages 112 and 122 of the embodiment described above with reference to FIGS. 5 to 7 in terms of shape. In addition, the embodiment of FIG. 8 differs from the embodiment of FIGS. 5 to 7 in that the first and second passages 141a and 142a and the first and second accumulation openings 141b and 142b are not formed in the embodiment of FIG. 8.

That is, in the first passage 110a including a first inlet/outlet port 111a and a first connection passage 112a, the first connection passage 112a interconnects the first inlet/outlet port 111a and a third passage 130, wherein the first connection passage 112a is vertically formed (i.e., outer path 110a is oriented perpendicular to that of central path 130). In addition, in the second passage 120a including a second inlet/outlet port 121a and the second connection passage 122a, the second connection passage 122a interconnects the second inlet/outlet port 121a and the third passage 130, wherein the second connection passage 122a is vertically formed in the illustration of FIG. 8, while passage 130 runs horizontal (Inner path 120a is oriented perpendicular to the orientation of central path 130.) That is, the first and second connection passages 112a and 122a extending vertically from the opposite ends of the third passage 130 are connected to the first and second inlet/outlet ports 111a and 121a, respectively.

If the touch screen panel 11, the intermediate member 13 and LCD panel 12 are stacked in this order, the first inlet/outlet port 111a is exposed to the outside, and the second inlet/outlet port 121a is exposed to the inner space S, thereby interconnecting the inner space S and the outside without being blocked by the LCD panel 12. Accordingly, as the touch screen panel 11 is pushed by a touch or the like, the air in the inner space S is naturally discharged to the outside through the second passage 120a, the third passage 130 and the first passage 110a, and the air from the outside is naturally introduced into the inner space S through the first passage 110a, the third passage 130 and the second passage 120a.

Although it was described that no foreign matter accumulation part is formed in the present embodiment, the present invention is not limited to this. Various modifications may be made within the scope of the present invention. For example, one or more filter members may be additionally provided in the first, third and second passages 110a, 130 and 120a so as to filter foreign matter contained in the air.

FIG. 9 shows still another embodiment, 100b, for the air passage in the member shown in FIG. 7. As shown in FIG. 9, air passage 100b differs from air passage 100 of FIGS. 4 to 7 in terms of the shapes of the first and second connection passages 112a; 112b and 122a; 122b, and the foreign matter accumulation parts 143, and is also distinguished from the embodiment described above with reference to FIG. 8 in terms of whether the foreign matter accumulation parts 143 are provided or not. That is, in the present embodiment, the first and second connection passages 112b and 122b are vertically connected to the first and second inlet/outlet ports 112b and 121b from the opposite ends of the third passages 130, respectively. In addition, foreign matter accumulation parts 143 are formed at the ends of the third passage 130 and the ends of the first and second passages 111b and 121b connected to the ends of the third passage 130, wherein the foreign matter accumulation parts 143 include a first accumulation opening 143a formed towards the inner periphery 13b of the intermediate member 112b from the end of the first connection passage 112b, and a second accumulation opening 143b formed towards the outer periphery 13a of the intermediate member 13, respectively. Accumulation openings 143a and 143b have curved, e.g., semicircular, boundaries in the exemplary embodiment. Also in the present embodiment, if the touch screen panel 11, the intermediate member 13 and the LCD panel 12 are stacked in this order, the first inlet/outlet port 111b of the air passage 100b is exposed to the outside, and the second inlet/outlet port 121b is exposed to the inner space S, thereby interconnecting the inner space S and the outside without being blocked by the LCD panel 12. Due to this, the air introduced through the first inlet/outlet port 111b from the outside is moved through the first connection passage 112b, and is firstly introduced into the first accumulation opening 143a due to the moving direction of the air from the first connection passage 112b. The first accumulation opening 143a filters foreign matter contained in the air from the outside. The air firstly filtered by the first accumulation opening 143a is moved along the third passage 130. The air moved along the third passage 130 is filtered once again through the second accumulation opening 143b, and then moved to the second connection passage 122, and then introduced into the inner space S through the second inlet/outlet opening 143b. Due to this, the touch screen panel 11 flexed toward the LCD panel 12 due to the touch and push thereof is returned to its original status, thereby preventing the oil film phenomenon from being continued, as well as rapidly removing the oil film phenomenon.

Although it was described that the foreign matter accumulation parts 143 are provided at the opposite ends of the third passage 130, the present invention is not limited to this. Various modifications can be made within the scope of the present invention. For example, it is possible to form such a foreign matter accumulation part only at the right end (with reference to FIG. 7) of the third passage 130.

Accordingly, the air in the inner space can be naturally discharged to the outside through the second passage 120b, the third passage 130 and the first passage 11b as the touch panel 11 is touched and pushed, and the air from the outside can be naturally introduced into the inner space S through the first passage 110b, the third passage 130 and the second passage 120b.

As described above with reference to the several embodiments, the air passage 100, 100a or 100b for interconnecting the inner space S and the outside of a display device in such a manner that the air passage 100, 100a or 100b can interconnect the inner space and the outside without being blocked when the touch screen panel 11, the intermediate member 13 and the LCD panel 12 are assembled, thereby preventing the oil film phenomenon from being continued as well as allowing the oil film phenomenon to be rapidly removed.

Preferably, the intermediate member 13 is composed of an elastic material.

As discussed above, the present invention provides an air passage in an intermediate member interposed between a touch screen panel and an LCD panel in a display device. As a result, even after the intermediate member is assembled between the touch screen panel and the LCD panel, air flow between the inner space and the outside of the touch screen panel and the LCD panel can be facilitated.

In addition, since the air passage is bent or curved two or more times to interconnect the inner and outer side of the intermediate member of the display device, it is possible to prevent the air passage from being blocked even when the display device is assembled.

Further, since air can be freely moved between the touch screen panel and the LCD panel through the air passage, it is possible to prevent the occurrence of an oil film phenomenon when the touch screen panel is pushed by a touch or the like, and to rapidly remove the oil film phenomenon even if such a phenomenon occurs.

Moreover, since outer and inner connection paths are slanted with respect to a central path, and foreign matter accumulation parts are provided at the opposite ends of the central path to filter foreign matter contained in air introduced from the outside, foreign matter contained in the air introduced through the outer path can be prevented from being introduced between the touch screen panel and the LCD panel.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A display device, comprising:
   a touch-sensitive panel that is arranged to detect touch input;
   a display panel; and
   an intermediate member positioned between the touch-sensitive panel and the display panel to define an inner space of the display device, the intermediate member having an air passage formed therein, the air passage including:
   (i) a first path having a first end and a second end,
   (ii) a plurality of paths including at least a second path and a third path, each of the plurality of paths branching from a respective location in the first path that is situated between the first end and the second end,
   (iii) a first foreign matter accumulation space for filtering foreign matter contained in air that enters the first path, the first foreign matter accumulation space being provided at the first end of the first path, the first foreign matter accumulation space being connected to an exterior of the display device via the second path, and the first foreign matter accumulation space being connected to the inner space of the display device via the third path, and
   (iv) a port formed on an outer periphery of the intermediate member that enables fluid communication between the inner space and the exterior of the display device, wherein the second path spans from the first path to port.

2. The display device of claim 1, wherein the second and third path are slanted relative to the first path.

3. The display device of claim 1, wherein the first path is longer than each of the plurality of paths.

4. The display device of claim 1, further comprising a second foreign matter accumulation space provided at the second end of the first path.

5. The display device of claim 1, wherein the second path extends in a direction that is transverse to the first path.

6. The display device of claim 1, wherein each of the first path, the second path, and the third path is formed in a shape of a straight line.

7. The display device of claim 1, wherein the intermediate member is composed of an elastic material.

8. An electronic device comprising a display device, the display device including an intermediate structure disposed between a display panel and a touch-sensitive panel arranged to detect touch input, the intermediate structure forming an inner space of the display device and having an air passage formed therein that connects the inner space with an exterior of the display device, the air passage including:
   (i) a first path having a first end and a second end,
   (ii) a plurality of paths including at least a second path and a third path, each of the plurality of paths branching from a respective location in the first path that is situated between the first end and the second end, and
   (iii) a first foreign matter accumulation space for filtering foreign matter contained in air that enters the first path, the first foreign matter accumulation space being provided at the first end of the first path, the first foreign matter accumulation space being connected to the exterior of the display device via the second path, and the first foreign matter accumulation space being connected to the inner space of the display device via the third path,
   (iv) a port formed on an outer periphery of the intermediate structure that enables fluid communication between the inner space and the exterior of the display device, wherein the second path spans from the first path to the port.

9. The electronic device of claim 8, wherein the second and third path are slanted relative to the first path.

10. The electronic device of claim 8, wherein the first path is longer than each of the plurality of paths.

11. The electronic device of claim 8, wherein the air passage further includes a second foreign matter accumulation space disposed at the second end of the first path.

12. The electronic device of claim 8, wherein the second path extends in a direction that is transverse to the first path.

13. The electronic device of claim 8, wherein each of the first path, the second path, and the third path is formed in a shape of a straight line.

14. The electronic device of claim 8, wherein the intermediate structure is composed of an elastic material.

* * * * *